Patented Sept. 11, 1928.

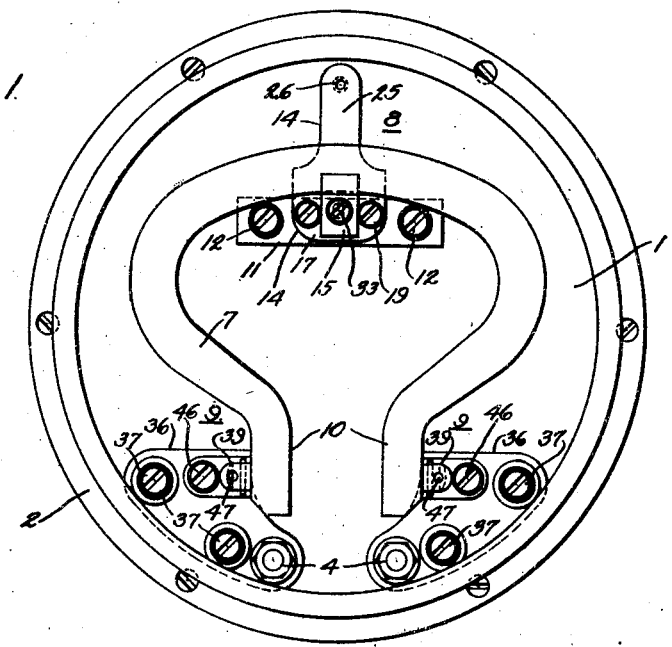

1,684,061

UNITED STATES PATENT OFFICE.

PAUL KREISEL, OF NEWARK, NEW JERSEY, ASSIGNOR TO WESTINGHOUSE ELECTRIC & MANUFACTURING COMPANY, A CORPORATION OF PENNSYLVANIA.

ELECTRICAL MEASURING INSTRUMENT.

Application filed May 12, 1923. Serial No. 638,621.

My invention relates to electrical measuring instruments and particularly to supporting and positioning means for the dials and permanent magnets thereof.

One object of my invention is to provide an instrument, of the above-indicated character, in which supporting and positioning means for the permanent magnet shall permit the ready mounting of the magnet and the return of the same to proper position after dismounting.

Another object of my invention is to provide a device that shall constitute a combined supporting and positioning means for both the permanent magnet and the dial of an electrical measuring instrument.

A further object of my invention is to provide an electrical measuring instrument that shall be simple and durable in construction, economical to manufacture and effective in its operation.

In practicing my invention, I provide a plurality of relatively simple sheet metal clips or members that constitute means for accurately mounting the permanent magnet and dial of an instrument, that shall facilitate the assembly thereof and that otherwise greatly improve the construction and economize in the manufacture of the instrument.

Figure 1 of the accompanying drawing is a plan view, with the dial and window removed, of an instrument constructed in accordance with my invention, Fig. 2 is a sectional view thereof, taken at right angles to Fig. 1, with the dial and window in position, Figs. 3 and 4 are detail views of one member embodied in the construction of the instrument, Figs. 5 and 6 are similar views of another member thereof, and Figs. 7, 8 and 9 are detail views of a further member of the instrument.

Since no parts of the instrument other than the dial, the permanent magnet and the supporting devices therefor form any part of my present invention, it is not deemed necessary to show or describe the same.

In general, an instrument constructed in accordance with my invention, comprises a main base plate or support 1, a casing 2, mounting studs 3, terminal leads 4, a window 5, a dial 6, a permanent magnet 7, an intermediate supporting and positioning structure 8 for the magnet and dial, and a pair of supporting and positioning devices 9 for the magnet and dial disposed adjacent to the pole ends 10 of the magnet.

The magnet 7 is preferably of rectangular cross-sectional area having its pole ends 10 parallel and perpendicular to the intermediate portion thereof.

The structure 8 comprises an insulating member or block 11 secured to the base plate 1, as by screws 12, a sheet metal member 14 and a sheet metal clip 15.

The member 14, shown in detail in Figs. 3 and 4, is, as viewed in plan in Figs. 1 and 3, of substantially fan shape, having an enlarged or widened base end 17 in which are provided a pair of apertures 18, through which screws 19 extend to mount the member 14 on the insulating member 11, and a central opening 20. From the base end portion 17, which lies against and fits a depressed front surface 22 in the block 11, an intermediate portion 23 of the member 14 extends at right angles to the end 17 and fits against the top surface of the magnet 7. This arrangement, whereby the base end 17 of the member 14 rests against the rear surface of the magnet and the portion 23 engages the upper surface of the magnet, provides means for accurately limiting the upward and inward movement of the magnet during assembly. A portion 25, parallel to the base portion 17, projects from the portion 23 and is provided with an opening 26 which registers with an opening in the dial 6 and through which a screw 27 extends to hold the dial in position.

The clip 15, shown in detail in Figs. 5 and 6, is bent to have portions 29 and 30 which engage the front and under surfaces, respectively, of the intermediate portion of the magnet 7 and to have a portion 31 opposite the base end 17 of the member 14. The portion 31 is provided with a slot 32, for disposition opposite the opening 20 in the member 14, to receive a screw 33 and is slightly bent at its inner end portion 34 to provide a resilient clamping action therein against the magnet 7.

The supporting and positioning devices 9 are similar, each comprising an insulating member or block 36 secured to the base plate 1, as by screws 37 and provided with an opening for the reception of one of the instrument leads 4.

A sheet metal member or clip 39, shown in detail in Figs. 7, 8 and 9, is bent to substantially U-shape having a long leg 41, an intermediate portion 42 and a short leg 43 that is also preferably narrower than the leg 41. The long leg 41 lies flat against, and fits in, a depressed surface in the block 36, similarly to the manner in which the member 17 fits in the block 11, and is provided with an opening 45 for the reception of a screw 46 by which it is secured to the block 36. The intermediate portion 39 extends normal to the plane of the base plate 1 and is arranged to be flat against a surface of the pole end 10 of the magnet 7.

From the intermediate portion 39, the short leg 43 extends parallel to the rear surface of the dial 6 and is provided with an opening 47 which registers with an opening in the dial and through which openings a screw 48 extends to hold the dial in position.

By the above construction, the dial 6 is supported and the lower or pole ends 10 of the magnet 7 are accurately positioned to permit the ready assembly and replacement thereof.

By my invention, extreme simplicity and economy of construction are obtained by which a neat, compact and effective instrument are provided.

While I have shown and described a particular form of my invention, changes may be effected therein without departing from the spirit and scope thereof, as set forth in the appended claims.

I claim as my invention:

1. In an electrical measuring instrument, the combination with a casing and a dial, of a permanent magnet of inverted substantially U-shape disposed in spaced relation to the rear wall of the casing, means for suspending the magnet by its upper central portion comprising means for limiting the upward and inward positions of the magnet relative to the casing and for supporting the dial, and separate means co-operating between each leg of the magnet and the casing for positioning the magnet relative to said suspension means and to the casing and for supporting the dial.

2. In an electrical measuring instrument, the combination with a casing and a dial, of a permanent magnet of inverted substantially U-shape disposed in spaced relation to the rear wall of the casing, means for suspending the magnet by its upper central portion comprising means for limiting the upward and inward positions of the magnet relative to the casing and for supporting the dial, said means also including means for clamping the magnet in place, and separate means co-operating between each leg of the magnet and the casing for positioning the magnet relative to said suspension means and to the casing and for supporting the dial.

3. In an electrical measuring instrument, the combination with a metal casing and a dial, of a permanent magnet of inverted substantially U-shape disposed in spaced relation to the rear wall of the casing, means secured to the casing for suspending the magnet at its upper central portion comprising a member constructed to limit the upward and inward positions of the magnet relative to the casing and to support the dial, and means cooperating between each leg of the magnet and the casing each comprising an insulating member secured to the casing and a metal member in the insulating member for positioning the magnet relative to said suspension means and to the casing and for supporting the dial.

4. In an electrical measuring instrument, the combination with a metal casing and a dial, of a permanent magnet of inverted substantially U-shape disposed in spaced relation to the rear wall of the casing, means secured to the casing for suspending the magnet at its upper central portion comprising a member constructed to limit the upward and inward positions of the magnet relative to the casing and to support the dial, and means cooperating between each leg of the magnet and the casing each comprising an insulating member secured to the casing and constituting a terminal mounting means for the instrument, and a metal member on the insulating member for positioning the magnet relative to said suspension means and to the casing.

5. In an electrical measuring instrument, the combination with a metal casing and a dial, of a permanent magnet of inverted substantially U-shape disposed in spaced relation to the rear wall of the casing, means secured to the casing for suspending the magnet at its upper central portion comprising a member constructed to limit the upward and inward positions of the magnet relative to the casing and to support the dial, and means cooperating between each leg of the magnet and the casing each comprising an insulating member secured to the casing and constituting a terminal mounting means for the instrument, and a metal member on the insulating member for positioning the magnet relative to said suspension means and to the casing and for supporting the dial.

6. In an electrical measuring instrument, the combination with a supporting member and a permanent magnet, of means for clampingly securing the magnet to the supporting member comprising a member secured to the supporting member and having a clamping-jaw portion fitting a portion of the magnet, a member having a co-operating clamping-jaw portion for the magnet and a yieldable holding portion, and means co-operating between the supporting member and said yieldable holding portion for yieldably clamping said jaw portions against the magnet.

In testimony whereof, I have hereunto subscribed my name this 7th day of May, 1923.

PAUL KREISEL. [L. S.]